(12) United States Patent
Asplund et al.

(10) Patent No.: US 7,497,220 B2
(45) Date of Patent: Mar. 3, 2009

(54) METHOD AND APPARATUS FOR CLEANING A TURBOFAN GAS TURBINE ENGINE

(75) Inventors: Peter Asplund, Hasselby (SE); Carl-Johan Hjerpe, Nacka (SE)

(73) Assignee: Gas Turbine Efficiency AB (SE)

( * ) Notice: Subject to any disclaimer, the term of this patent is extended or adjusted under 35 U.S.C. 154(b) by 486 days.

(21) Appl. No.: 10/536,003

(22) PCT Filed: Feb. 16, 2004

(86) PCT No.: PCT/SE2004/000194

§ 371 (c)(1),
(2), (4) Date: May 20, 2005

(87) PCT Pub. No.: WO2005/077554

PCT Pub. Date: Aug. 25, 2005

(65) Prior Publication Data

US 2006/0048796 A1 Mar. 9, 2006

(51) Int. Cl.
*B08B 3/02* (2006.01)
*B08B 9/00* (2006.01)

(52) U.S. Cl. ............... 134/22.1; 134/22.18; 134/32; 134/33; 134/34; 134/167 R; 134/169 A; 134/172; 415/115

(58) Field of Classification Search ............... 134/22.1, 134/22.18, 32, 33, 169 A, 198, 196; 415/1, 415/113, 114, 115
See application file for complete search history.

(56) References Cited

U.S. PATENT DOCUMENTS

| | | | |
|---|---|---|---|
| 4,059,123 A | 11/1977 | Bartos et al. | |
| 4,196,020 A * | 4/1980 | Hornak et al. | 134/167 R |
| 4,834,912 A | 5/1989 | Hodgens, II et al. | |
| 5,273,395 A | 12/1993 | McDermott | |
| 5,868,860 A * | 2/1999 | Asplund | 134/22.1 |
| 6,394,108 B1 | 5/2002 | Butler | |
| 6,932,093 B2 * | 8/2005 | Ogden et al. | 134/22.1 |
| 2004/0055626 A1 * | 3/2004 | Hata | 134/57 R |

FOREIGN PATENT DOCUMENTS

SE 522 306 C2 2/1999

\* cited by examiner

*Primary Examiner*—Michael Barr
*Assistant Examiner*—Saeed T Chaudhry
(74) *Attorney, Agent, or Firm*—DLA Piper LLP (US)

(57) ABSTRACT

Device for cleaning a gas turbine engine (2), and in particular an engine of turbofan type. The present invention further relates to a method for cleaning such a engine. The device comprises a plurality of nozzles (31, 33, 35) arranged to atomize cleaning liquid in the air stream in an air inlet (20) of the engine (2) up-stream of a fan (25) of the engine (2). According to the invention a first nozzle (31) is arranged at a position such that the cleaning liquid emanating from the first nozzle (31) impinges the surfaces of the blades (40) substantially on the pressure side (53); a second nozzle (35) is arranged at a position such that the cleaning liquid emanating from the second nozzle (35) impinges the surfaces of the blades (40) substantially on the suction side (54); and a third nozzle (33) is arranged at a position such that the cleaning liquid emanating from the third nozzle (33) passes substantially between the blades (40) and enters an inlet (23) of the core engine (203). Thereby, the different types of fouling found on the fan and in the core engine compressor of turbofan engine can be removed in an efficient manner.

22 Claims, 7 Drawing Sheets

METHOD AND APPARATUS FOR CLEANING A TURBOFAN GAS TURBINE ENGINE

This is a nationalization of PCT/SE04/000194 filed Feb. 16, 2004 and published in English.

TECHNICAL FIELD

The present invention generally relates to the field of cleaning gas turbine engines, and more specifically a method and apparatus for cleaning a turbofan gas turbine engine installed in an aircraft.

BACKGROUND OF THE INVENTION

A gas turbine installed as an aircraft engine comprises a compressor compressing ambient air, a combustor burning fuel together with the compressed air and a turbine for powering the compressor. The expanding combustion gases drive the turbine and also result in thrust used for propelling the air craft.

Gas turbines engines consume large quantities of air. Air contains foreign particles in form of aerosols which enters the gas turbine compressor with the air stream. The majority of the foreign particles will follow the gas path and exit the engine with the exhaust gases. However, there are particles with properties of sticking on to components in the compressor's gas path. Stationary gas turbines like gas turbines used in power generation can be equipped with filter for filtering the air to the compressor. However, gas turbines installed in aircrafts are not equipped with filters because it would create a substantial fall in pressure and are thereby more exposed to air contaminants. Typical contaminants found in the aerodrome environment are pollen, insects, engine exhaust, leaking engine oil, hydrocarbons coming from industrial activities, salt coming from nearby sea, chemicals coming from aircraft de-icing and airport ground material such as dust.

Preferably engine components such as compressor blades and vanes should be polished and shiny. However, after a period of operation a coating of foreign particles builds up. This is also known as compressor fouling. Compressor fouling results in a change in the properties of the boundary layer air stream of the components. The deposits result in an increase of the component surface roughness. As air flows over the component surface the increase of surface roughness results in a thickening of the boundary layer air stream. The thickening of the boundary layer air stream has negative effects on the compressor aerodynamics. At the blade trailing edge the air stream forms a wake. The wake is a vortex type of turbulence with a negative impact on the air flow. The thicker the boundary layer the stronger the turbulence in the wake. The wake turbulence together with the thicker boundary layer has the consequence of a reduced mass flow through the engine. The reduced mass flow is the most profound effect of compressor fouling. Further, the thicker boundary layer and the stronger wake turbulence formed at the blade trailing edge result in a reduced compression pressure gain which in turn results in the engine operating at a reduced pressure ratio. Anyone skilled in the art of heat engine working cycles understands that a reduced pressure ratio result in a lower thermodynamic efficiency of the engine. The reduction in pressure gain is the second most remarkable effect from compressor fouling. The compressor fouling not only reduces the mass flow and pressure gain but also reduces the compressor isentropic efficiency. Reduced compressor efficiency means that the compressor requires more power for compressing the same amount of air. The reduced mass flow, pressure ratio and isentropic efficiency reduce the engine thrust capability. The power for driving the compressor is taken from the turbine via the shaft. With the turbine requiring more power to drive the compressor there will be less thrust for propulsion. For the air craft pilot this means he must throttle for more power as to compensate for the lost thrust. Throttling for more power means the consumption of fuel increases and thereby increasing operating costs.

Compressor fouling also has a negative effect to the environment. With the increase of fuel consumption follows an increase of emissions of green house gas such as carbon dioxide. Typically combustion of 1 kg of aviation fuel results in formation of 3.1 kg carbon dioxide.

The loss in performance caused by compressor fouling also reduces the durability of the engine. As more fuel has to be fired for acquiring a required thrust, follows an increase in the temperature in the engine combustor chamber. When the pilot throttles for take-off on the runway the temperature in the combustion chamber is very high. The temperature is not too far from the limit of what the material can stand. Controlling this temperature is a key issue in engine performance monitoring. The temperature is measured with a sensor in the hot gas path section downstream of the combustor outlet. This is known as exhaust gas temperature (EGT) and is carefully monitored. Both exposure time and temperature are logged. During the lifetime of the engine the EGT log is frequently reviewed. At a certain point of the EGT record it is required that the engine will have to be taken out of service for an overhaul.

High combustor temperature has a negative effect to the environment. With the increase of combustor temperature follows an increase of NOx formation. NOx formation depends to a large extent on the design of the burner. However, any incremental temperature to a given burner results in an incremental increase in NOx.

Hence, compressor fouling has significant negative effects to aero engine performance such as increased fuel consumption, reduced engine life, increased emissions of carbon dioxide and NOx.

Jet engines can have a number of different designs but the above-mentioned problems arises in all of them. Typical small engines are the turbojet, turboshaft and turboprop engines. Other variants of these engines are the two compressor turbojet and the boosted turboshaft engine. Among the larger engines there are the mixed flow turbofan and the unmixed flow turbofan which both can be designed as one, two or three shaft machines. The working principles of these engines will not be described here.

The turbofan engine is designed for providing a high thrust for aircraft operating at subsonic velocities. It has therefore found a wide use as engines for commercial passenger aircrafts. The turbofan engine comprises of a fan and a core engine. The fan is driven by the power from the core engine. The core engine is a gas turbine engine designed such that power for driving the fan is taken from a core engine shaft. The fan is installed upstream of the engine compressor. The fan consists of one rotor disc with rotor blades and alternatively a set of stator vanes downstream if the rotor. Prime air enters the fan. A discussed above, the fan is subject to fouling by insects, pollen as well as residue from bird impact, etc. The fan fouling may be removed by washing using cold or hot water only. This cleaning washing process is relatively easy to perform.

Downstream of the fan is the core engine compressor. Significant for the compressor is that it compresses the air to high pressure ratios. With the compression work follows a temperature rise. The temperature rise in a high pressure compressor may be as high as 500 degree Celsius. We find that the compressor is subject to different kind of fouling compared to the fan. The high temperature results in particles more easily being "baked" to the surface and will be more difficult to remove. Analyses show that fouling found in core engine compressors are typically hydrocarbons, residues from anti-icing fluids, salt etc. This fouling is more difficult to remove. It may at some time be accomplished by washing with cold or hot water only. Else the use of chemicals will have to be practised.

A number of cleaning or washing techniques have been developed during the years. In principle, aero engine washing can be practised by taking a garden hose and spraying water into the engine inlet. This method has however a limited success due to the simple nature of the process. An alternative method is by hand scrubbing the compressor blades and vanes with a brush and liquid. This method has limited success as it does not enable cleaning of the interior blades of the compressor. Moreover, it is time-consuming. U.S. Pat. No. 6,394,108 to Butler discloses a thin flexible hose which one end is inserted from the compressor inlet towards the compressor outlet in between the compressor blades. At the inserted end of the hose there is a nozzle. The hose is slowly retracted out of the compressor while liquid is being pumped into the hose and sprayed through the nozzle. The patent discloses how washing is accomplished. However the washing efficiency is limited by the compressor rotor not being able to rotate during washing. U.S. Pat. No. 4,059,123 to Bartos discloses a mobile cart for turbine washing. However, the patent does not disclose how the cleaning process is accomplished. U.S. Pat. No. 4,834,912 to Hodgens II et al. discloses a cleaning composition for chemically dislodging deposits of a gas turbine engine. The patent illustrates the injection of the liquid into a fighter jet aircraft engine. However, no information is provided about the washing process. U.S. Pat. No. 5,868,860 to Asplund discloses the use of a manifold for aero engines with inlet guide vanes and another manifold for engines without inlet guide vanes. Further the patent discloses the use of high liquid pressure as means of providing a high liquid velocity, which will enhance the cleaning efficiency. However, the patent does not address the specific issues related to fouling and washing of turbofan aero engines.

The arrangement described hereinafter with reference to FIG. 1 is further regarded as common knowledge in this field. A cross section view of a single shaft turbojet engine is shown in FIG. 1. Arrows show the mass flow through the engine. Engine 1 is built around a rotor shaft 17 which at its front end is connected a compressor 12 and at its rear end a turbine 14. In front of the compressor 12 is a cone 104 arranged to split the airflow. The cone 104 is not rotating. The compressor has an inlet 18 and an outlet 19. Fuel is burnt in a combustor 13 where the hot exhaust gases drives turbine 14.

A washing device consist of a manifold 102 in form of a tube which in one end is connected to a nozzle 15 and the other end connected to a coupling 103. Hose 101 is at one end connected to coupling 103 while the other end is connected to a pump (not shown). Manifold 102 is resting upon cone 104 and is thereby held in a firm position during the cleaning procedure. The pump pumps a washing liquid to nozzle 15 where it atomizes and forms a spray 16. The orifice geometry of nozzle 15 defines the spray shape. The spray can form many shapes such as circular, elliptical or rectangular depending on its design. For example, a circular spray has a circular distribution of droplets characterized by the spray having the shaped of a cone. An elliptical spray is characterised by one of the ellipses axis is longer than the other. A rectangular spray is somewhat similar to the elliptical spray but with corners according to the definition of a rectangle. A square spray is somewhat similar to the circular spray in that the two geometry axes are of equal length but the square shaped spray has corners according to the definition of a square.

Liquid is atomized prior to entering the compressor for enhanced penetration into the compressor. Once inside the compressor the droplets collide with gas path components such as rotor blades and stator vanes. The impingement of the droplets results in wetting surface and establishing of a liquid film. The deposited particles on the gas path components are released by mechanical and chemical act of the liquid. Liquid penetration into the compressor is further enhanced by allowing the rotor shaft to rotate during washing. This is done by letting the engine's starter motor turn the rotor whereby air is driven through the engine carrying the liquid from the compressor inlet towards the outlet. The cleaning effect is further enhanced by the rotation of the rotor as the wetting of the blades creates a liquid film which will be subject to motion forces such as centrifugal forces during washing.

What is said about the cleaning of the compressor will also have effect on cleaning of the whole gas turbine engine. As the cleaning liquid enters the engine compressor and the rotor is rotating the washing fluid will enter the combustion chamber and further through the turbine section and thereby cleaning the whole engine.

However, this method is not efficient for a turbofan turbine engine for a number of reasons. Firstly, because the fouling of different components of a turbofan engines may have significantly different properties regarding, for example, the stickiness, it will require different methods for the removal as discussed above. Secondly, since the fan and its cone for splitting the airflow is rotating, the cone cannot be used for holding the manifold. Possible, the manifold can be mounted on a stand or a frame placed upstream of the fan but this arrangement would not provide an efficient cleaning of the engine since the main part of the cleaning liquid emanated from the nozzles would impinge at the suction side of the blades of the fan.

SUMMARY OF THE INVENTION

Thus, an object of the present invention is to provide a device and a method for removing the different types of fouling found on the fan and in the core engine compressor of turbofan engine and thereby reduce the negative effects of the fouling effects to aero engine performance such as increased fuel consumption, reduced engine life, increased emissions of carbon dioxide and NOx.

It is further an object of the present invention to provide an apparatus and a method that are able to clean the fan and the core engine compressor in one washing operation.

These and other objects are achieved according to the present invention by providing a method and an apparatus having the features defined in the independent claims. Preferred embodiments are defined in the dependent claims.

For the purposes of clarity, the terms "radial direction" and "axial direction" refer to a direction radially from the centreline of the engine and a direction along the centreline of the engine, respectively.

In the context of the present invention, the term "tangential angle" relates to an angle tangential viewed from the centreline of the engine.

According to a first aspect of the present invention, there is provided a device for cleaning a gas turbine engine, which engine includes at least one engine shaft, a rotatably arranged fan comprising a plurality of fan blades mounted on a hub and extending substantially in a radial direction, each having a pressure side and a suction side, and a core engine including a compressor unit and turbines for driving the compressor unit and the fan, comprising a plurality of nozzles arranged to atomize a cleaning liquid in the air stream in an air inlet of the engine up-stream of the fan. The device according to the first aspect of the present invention comprises a first nozzle arranged at a first position relative a centre line of the engine such that the cleaning liquid emanated from the first nozzle impinges the surfaces of the blades substantially on the pressure side; a second nozzle arranged at a second position relative the centre line of the engine such that the cleaning liquid emanated from the second nozzle impinges the surfaces of the blades substantially on the suction side; and a third nozzle arranged at a third position relative the centre line of the engine such that the cleaning liquid emanated from the third nozzle passes substantially between the blades and enters an inlet of the core engine.

According to a second aspect of the present invention, there is provided a method for cleaning a gas turbine engine, which engine includes at least one engine shaft, a rotatably arranged fan comprising a plurality of fan blades mounted on a hub and extending substantially in a radial direction, each having a pressure side and a suction side, and a core engine including a compressor unit and turbines for driving the compressor unit and the fan, comprising the step of atomizing cleaning liquid in the air stream in an air inlet of the engine up-stream of the fan by means of a plurality of nozzles, The method according to the second aspect of the present invention further comprises the steps of: applying cleaning liquid emanated from a first nozzle substantially on the pressure side; applying cleaning liquid emanated from a second nozzle substantially on the suction side; and directing cleaning liquid emanated from a third nozzle such that the cleaning liquid passes substantially between the blades and enters an inlet of the core engine.

Thus, the present invention is based on the insight that the properties of the fouling of different components of the engine have different properties and therefore require different approaches for the cleaning. As an example, the fouling of the core compressor is has different properties compared to the fouling of the blades of the fan, for example, due to the higher temperature of the compressors. The high temperature results in particles more easily being "baked" to the surface and will be more difficult to remove. Analyses show that fouling found in core engine compressors are typically hydrocarbons, residues from anti-icing fluids, salt etc. This fouling is therefore more difficult to remove than the fouling of the blades of the fan.

This solution provides several advantages over the existing solutions. One advantage is that the cleaning of the parts of the engine subjected for fouling is adapted to the certain properties of the fouling of each part. Accordingly, the cleaning of the different components of the fan and the core engine can be individually adapted. This entails a more efficient and time-saving cleaning of the engine compared to the known methods, which utilize an uniform cleaning process. Thereby, costs can be saved compared to the known methods because the consumption of fuel can be reduced.

Another advantage is that both the suction side as well as the pressure side of the blades of the fan can be reached by the cleaning liquid. Thereby, the cleaning of the fan is more complete and efficient compared to the known methods as they do not allow cleaning of the pressure side.

A further advantage is that the cleaning device according to the present invention can be used a variety of different types of turbine engines including turbo-fan gas turbine engine having one, two, three, or more shafts, and in which the fan and the cone for splitting the airflow is rotating.

An additional advantage is that the durability of the engine can be increased since a more efficient fouling removal entails that the combustor temperature can be lowered. This has also a favourable effect on the environment due to a decrease of NOx formation.

According preferred embodiments of the present invention, the first nozzle and the second nozzle are arranged so that the cleaning liquid emanating from the first nozzle and the second nozzle, respectively, form a spray which, at impinge against a blade of the fan, has a width, along an axis substantially parallel with the radial extension of the blades of the fan, substantially equal to the length of a leading edge of the blade. Thereby, the spray will provide liquid to the blade on its entire length from tip to hub and the efficiency of the cleaning or washing of the pressure side and the suction side, respectively, of the blades of the fan are increased.

According to embodiments of the present invention, the third nozzle is arranged so that the cleaning liquid emanating from the third nozzle forms a spray which, at the inlet, has a width, along an axis substantially parallel with the radial extension of the blades of the fan, substantially equal to the distance between the splitter and the point on the hub.

Further objects and advantages of the present invention will be discussed below by means of exemplifying embodiments.

BRIEF DESCRIPTION OF THE DRAWINGS

Preferred embodiments of the invention will now be described in greater detail with reference to the accompanying drawings, in which.

DESCRIPTION OF PREFERRED EMBODIMENTS

Figure 1:
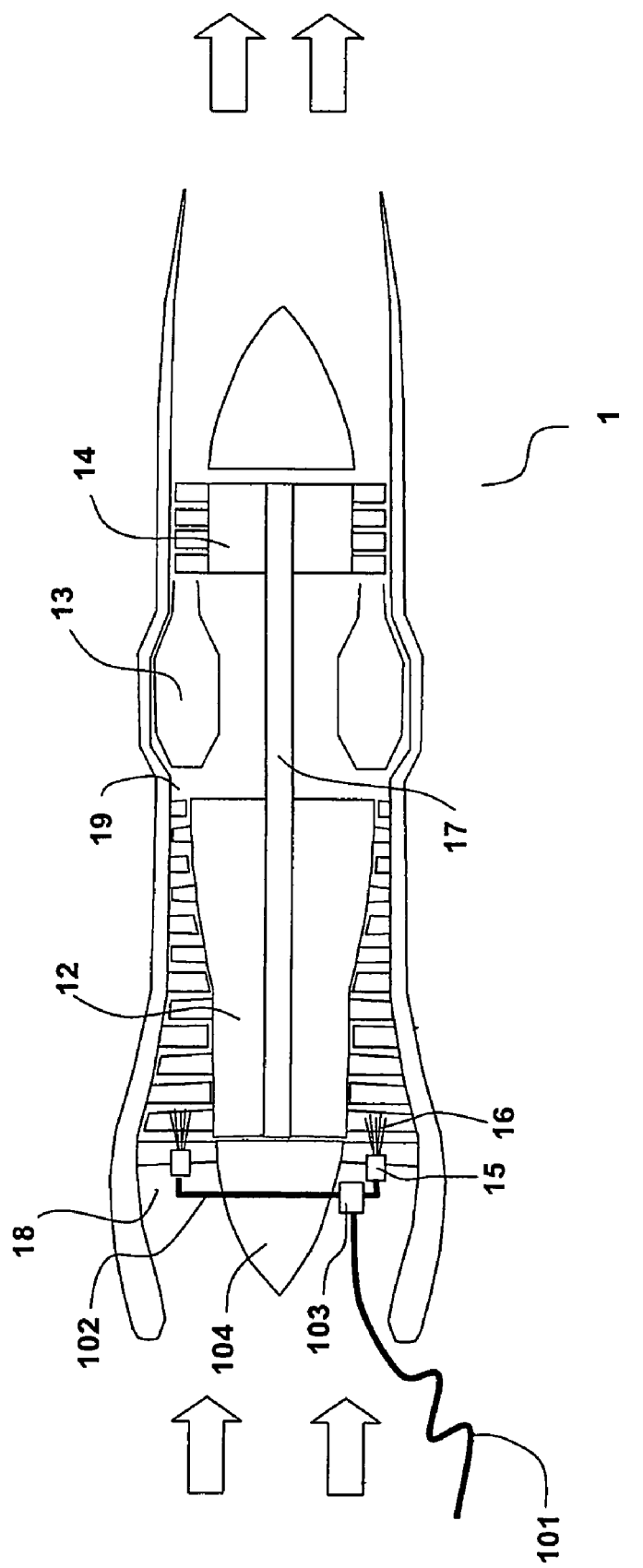
FIG. 1 shows the cross section of an aero gas turbine engine.
Figure 2:
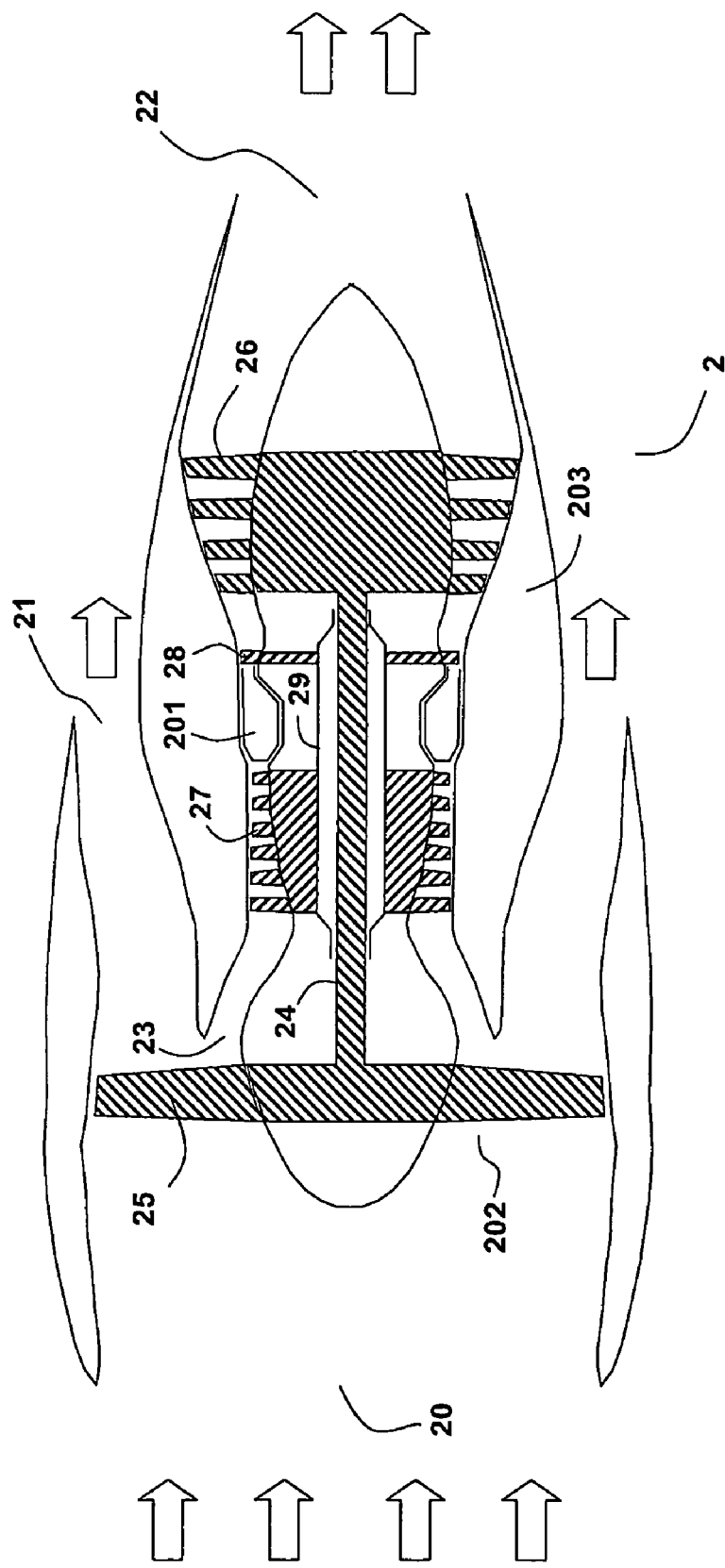
FIG. 2 shows the cross section of a turbo-fan gas turbine engine.

With reference now to FIG. 2, a two shaft unmixed turbofan aero engine will be described. The two shaft unmixed turbofan engine is one of several possible designs of a turbofan engine. This invention is not limited to the embodiment of this description and its figures as it is evident that the invention can be applied to other variants of turbofan engine designs such as the mixed turbofan engine or turbofan engines with one, three or more shafts. Characteristic for the turbofan engine on which the invention is suitable for practice is that the fan and its cone for splitting the airflow is rotating.

Engine 2 in FIG. 2 comprises of a fan unit 202 and a core engine unit 203. The engine is built around a rotor shaft 24 which at its front end is connected to a fan 25 and at the rear end turbine 26. Turbine 26 drives fan 25. A second shaft 29 is in form of a coaxial to first shaft 24. Shaft 29 is connected at its front end to compressor 27 and rear end to turbine 28. Turbine 28 drives compressor 27. Arrows show the air flow through the engine. Both fan unit 202 and core engine unit 203 provides thrust for propelling an aircraft.

Engine 2 has an inlet 20 where inlet air enters the engine. The inlet air flow is driven by fan 25. One portion of the inlet air exits at outlet 21. The remaining portion of the inlet air enters into the core engine at inlet 23. The air to the core engine is then compressed by compressor 27. The compressed air together with fuel (not shown) is combusted in combustor 201 resulting in pressurized hot combustion gases. The pressurized hot combustion gases expands towards core engine outlet 22. The expansion of the hot combustion gases is done in two stages. In a first stage the combustion gases expands to an intermediate pressure while driving turbine 28. In a second stage the hot combustion gases expands towards ambient pressure while driving turbine 26. The combustion gases exits the engine at outlet 22 at high velocity providing thrust. The gas from outlet 22 together with air from outlet 21 together make up the engine thrust.

Figure 3:
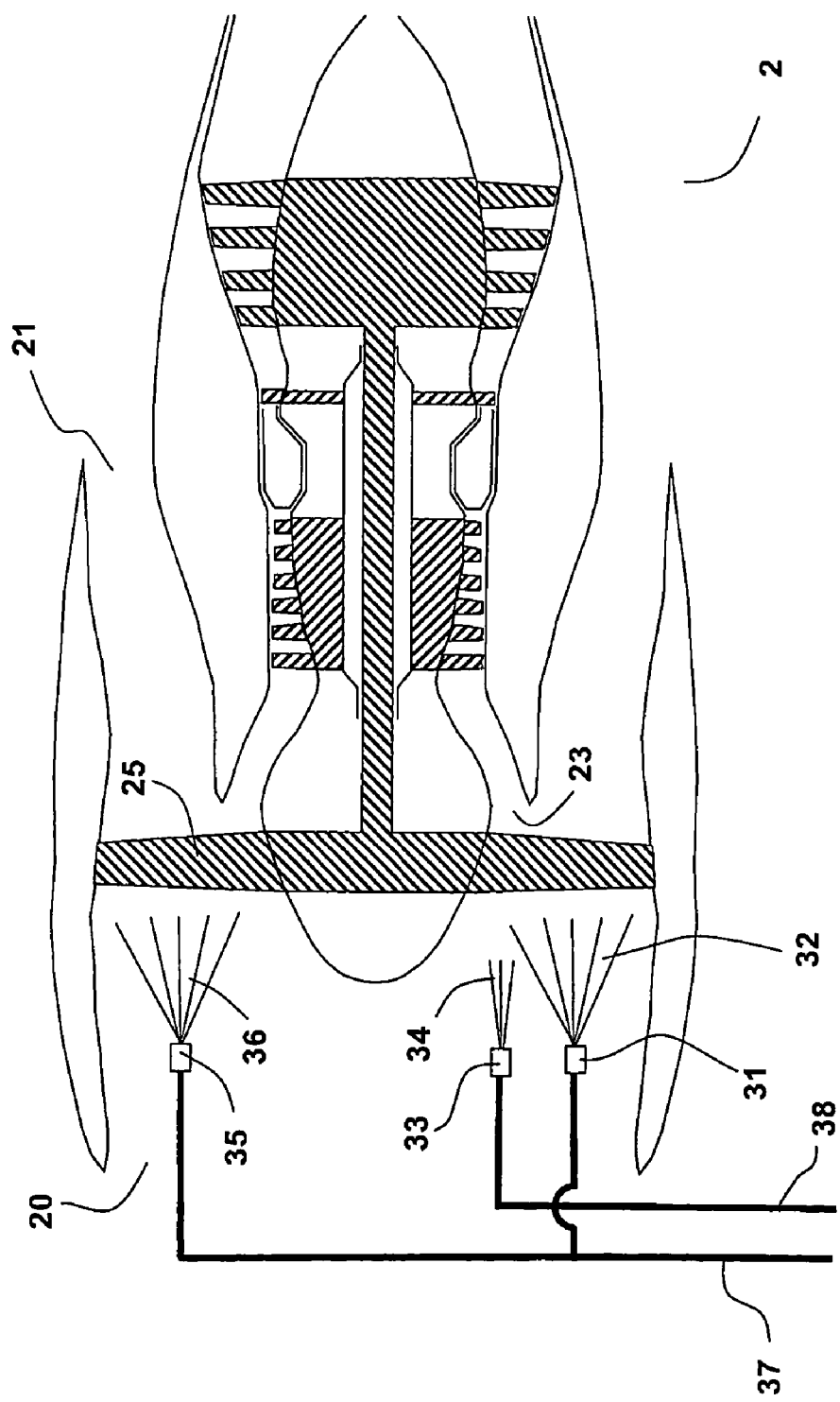
FIG. 3 shows the cross section of a turbo-fan gas turbine engine and the preferred embodiment of the invention with two nozzles for cleaning of the engine fan and one nozzle for cleaning the core engine.

FIG. 3 shows a cross section of the two shaft unmixed turbofan aero engine 2. Similar parts are shown with the same reference numbers as FIG. 2. FIG. 3 is an example only where the illustrated principals apply to other aero gas turbine engines designs such as the mixed turbofan engine or turbofan engines with one, three or more shafts.

Turbojet engine fans are designed with set of blades installed on the fan hub and pointing outward in basically radial direction. Each blade has a pressure side and a suction side defined by the direction of rotation of the fan. A compressor washing device consist of three nozzles types for spraying a cleaning fluid each one with a dedicated purpose. One nozzle type serves the purpose of providing a cleaning fluid for cleaning the pressure side of the fan. Another type nozzle serves the purpose of providing a cleaning fluid for cleaning the suction side of the fan. Yet another nozzle type serves the purpose of providing a cleaning fluid for cleaning the core engine. The nozzles are positioned upstream of fan 25. The nozzles have different spray characteristics and liquid capacities.

A washing device for washing fan 25 consist of a stiff manifold 37 in form of a conduit which in one end is connected to nozzles 31 and 35. Nozzles 31 and 35 are firmed by the stiff manifold 37. The other end of manifold 37 is connected to coupling (not shown) which is further connected to a hose (not shown) which is further connected to a pump (not shown). The cleaning liquid in conduit 37 may consist of water or water with chemicals. The liquids temperature may be as provided from the liquid source or may be heated in a heater (not shown). The pump pumps the washing liquid to nozzle 31 and 35. Liquid exiting the nozzle atomizes and forms a spray 32 and 36 respectively. Sprays 32 and 36 are directed towards fan 25.

The liquid pressure in conduit 37 is in the range 35-220 bar. This high pressure results in a high liquid velocity through the nozzle. Liquid velocity is in the range 50-180 m/s. The liquid velocity gives the droplets sufficient inertia to allow the droplets to travel to the fan from the nozzle tip. Arriving at the fan, the droplet velocity is significantly higher than the rotation velocity of the fan, thereby enabling washing of either the pressure side of the fan or the suction side of the fan as further described below. The droplets collide with the fan and will wet the fan surface. Contaminants will be released by chemical act of the chemicals or the water. During the cleaning process fan 25 is allowed to rotate by the help of the engine starter motor or by other means. The rotation serves several purposes. First, the rotation result in an air flow through the fan enhancing the travel of the spray towards the fan. The air flow thereby increases the collision velocity on the fan surface. A higher collision velocity improves the cleaning efficiency. Second, the rotation of the fan enables wetting of the entire fan area by use of only one nozzle as the spray coverage extends from the fan hub to the fan tip. Third, the fan rotation enhances the removal of released contaminants as the air flow will shear off liquid from the fan blade surface. Fourth, the fan rotation enhances the removal of released contaminants as centrifugal forces will shear off liquid from the fan blade surface.

A washing device for washing the core engine consist of a stiff manifold 38 in form of a conduit which in one end is connected to nozzles 33. Nozzle 33 is firmed by the stiff manifold 38. The other end of manifold 38 is connected to coupling (not shown) which is further connected to a hose (not shown) which is further connected to a pump (not shown). The cleaning liquid in conduit 38 may consist of water or water with chemicals. The liquids temperature may be as provided from the liquid source or may be heated in a heater (not shown). The pump pumps a washing liquid to nozzle 33. Liquid exiting the nozzle atomizes and forms a spray 34. Spray 34 is directed towards fan 25. The liquid pressure in conduit 38 is in the range 35-220 bar. This high pressure results in a high liquid velocity through the nozzle orifice. Liquid velocity is in the range 50-180 m/s. The liquid velocity gives the droplets sufficient inertia to allow the droplets to travel from the nozzle tip through the fan (in between the blades) to inlet 23. Arriving at inlet 23, the liquid enters the compressor.

Inside the compressor the droplets collide with compressor components such as blades and vanes. Contaminants will be released by chemical act of the chemicals or the water. During the cleaning process compressor 27 is allowed to rotate by the help of the engine starter motor or by other means. The rotation serves several purposes. First, the rotation result in an air flow through the compressor enhancing the travel of the droplets towards the compressor exit. The air flow thereby increases the collision velocity on the compressor surface. A higher collision velocity improves the cleaning efficiency. Second, the fan rotation enhances the removal of released contaminants as the air flow will shear off liquid from the fan blade surface. Third, the compressor rotation enhances the removal of released contaminants as centrifugal forces will shear off liquid from the compressor rotor blade surface.

The orifice geometry of nozzle 31, 35 and 33 defines the spray shape. The shape of the spray has a significant importance to washing result. The spray can be made to form many shapes such as circular, elliptical or rectangular. This is accomplished by an appropriate design and machining operations of the nozzle orifice. The circular spray has a circular distribution of droplets characterized as a conical spray. The elliptical spray is similar to the conical spray however characterised by one of the circle axis is longer than the other. It can be defined that the elliptical spray has a width-wise distribution and a thickness-wise distribution of droplets where the width-wise direction corresponds to the long axis of the ellipse and the thickness-wise direction corresponds to the short axis of the ellipse. It is also possible by appropriate design and machining operations of the nozzle orifice to create a rectangular spray. The rectangular spray shape has a width-wise and thickness-wise distribution similar as to the elliptical spray. The circular spray has equal width-wise and thickness-wise distribution. The square spray has equal width-wise and thickness-wise distribution.

Figure 4:
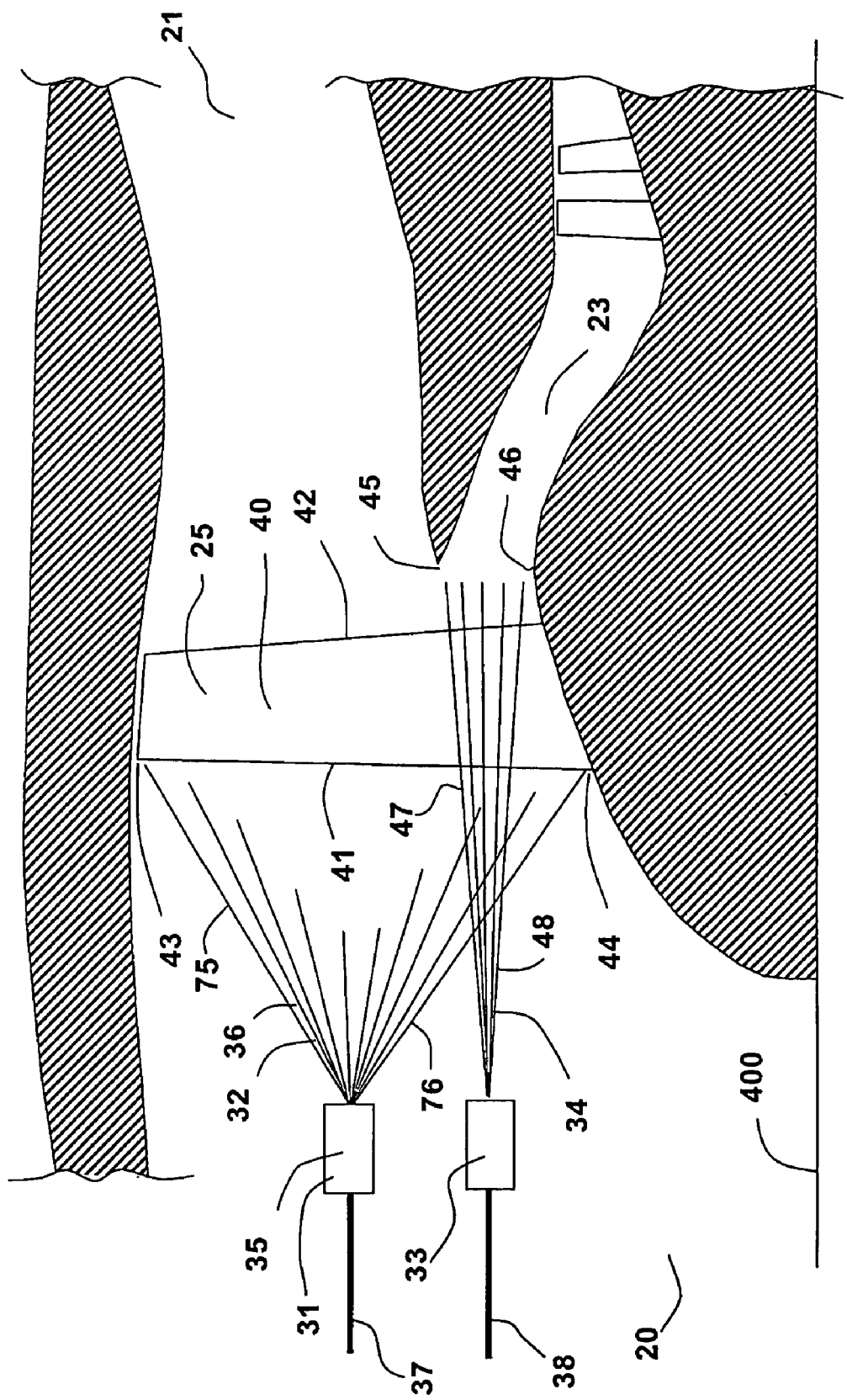
FIG. 4 shows details of the installation of nozzles.

FIG. 4 shows a cross section portion of the un-mixed turbofan engine. FIG. 4 shows details of the nozzle installation and orientation relative to engine centreline 400. Similar parts are shown with the same reference numbers as in FIG. 2 and FIG. 3. A fan 25 has a blade 40 with a leading edge 41 and a trailing edge 42. Blade 40 has a tip 43 and a boss 44 at the hub of fan 25. According to the design of the un-mixed turbofan engine, air flow 20 will after passing fan 25 be split into two flows. One portion of air flow 20 exits the fan section of the engine at outlet 21. The other portion of the air flow enters the core engine section at inlet 23 for providing air to the core engine. The air stream is split into the two streams by splitter 45. The opening of inlet 23 is limited by on one side splitter 45 and on the opposite side a point 46 on the hub.

According to the invention the washing system consist of three types of nozzles, each dedicated for a specific task. The first nozzle type serves the purpose of washing the pressure side of the fan blade. The first nozzle type has an elliptic or rectangular spray shape. The second nozzle type serves the purpose of washing the suction side of the fan blade. The second nozzle type has an elliptic or rectangular spray shape. The third nozzle serves the purpose of washing the core engine. The third nozzle type has an elliptic or rectangular spray shape. A washing unit according to the invention is made up of one or a multiple of each of the three nozzle types.

FIG. 4 shows the first nozzle type, nozzle 31, and it's with-wise projection. Nozzle 31 serves the purpose of providing washing liquid for washing the pressure side of blade 40. The leading edge 41 of blade 40 has a length equal to the distance between tip 43 and boss 44. Nozzle 31 is positioned in axial direction at a point preferably more than 100 mm, and more preferably more than 500 mm and less than 1000 mm, upstream of the fan leading edge 41. The nozzle 31 is positioned in a radial direction at a point less than the fan diameter and greater than the fan hub diameter. Nozzle 31 is directed towards fan 25. Nozzle 31 atomizes a washing liquid forming a spray 32. Nozzle 31 provides an elliptic or rectangular spray pattern. The nozzle is oriented so that the width-wise axis of the spray pattern is parallel with leading edge 41 of blade 40. At one side of the spray pattern the width-wise distribution is limited by streamline 75. On the opposite side of the spray pattern the width-wise distribution is limited by streamline 76. From the nozzle's orifice point the width-wise measure of spray 32 at leading edge 41 will be equal to the length of leading edge 41. The spray will thereby provide liquid to the blade on its entire length from tip to hub.

Figure 5:
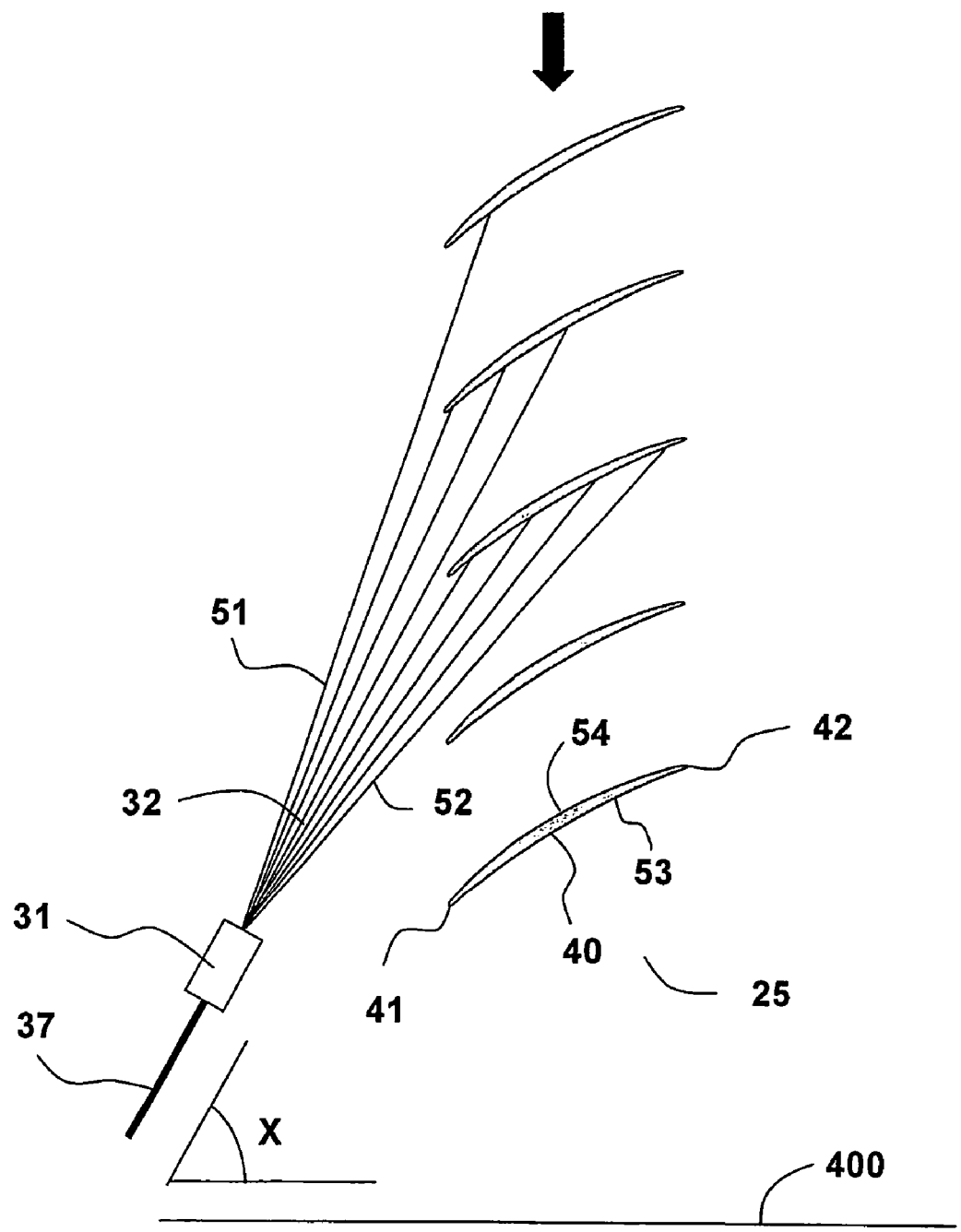
FIG. 5 shows the nozzle installation for cleaning of the fan blade pressure side.

FIG. 5 shows nozzle 31 as seen from a projection from the rotor periphery towards the shaft centre. In FIG. 5 nozzle 31 is seen in its thickness-wise projection. Nozzle 31 serves the purpose of providing washing liquid for washing the pressure side of blade 40. Fan 25 consists of a multiple of fan blades mounted on the fan hub and extending basically in radial direction. The view shows the typical blade pitch relative to the engine centreline 400. The fan rotates in the direction indicated by arrow. Blade 40 has a leading edge 41 and a trailing edge 42. Blade 40 has a pressure side 53 and a suction side 54. Nozzle 31 is positioned at a point upstream of fan 25. Nozzle 31 atomizes a washing liquid forming a spray 32. Nozzle 31 is directed towards fan 25. FIG. 5 shows the nozzle tangential angle X relative to the engine centreline 400. The tangential angle X is preferably more than 40 degrees, and more preferably more than 60 degrees and less than 80 degrees, relatively to the engine centreline 400. Nozzle 31 forms an elliptic or rectangular spray pattern. Nozzle 31 is oriented around the nozzle axis so that the thickness-wise axis of the spray pattern is limited on one side of the spray pattern by streamline 51 and on the opposite side of the spray pattern by streamline 52.

Returning to FIG. 4, this figure show the second nozzle type, nozzle 35, and it's with-wise projection. Nozzle 35 has the objectives of providing washing liquid for washing the suction side of blade 40. Blade 40 has a tip 43 and a boss 44. The leading edge 41 of blade 40 has a length equal to the distance between tip 43 and boss 44. Nozzle 35 is positioned in an axial direction at a point preferably more than 100 mm, more preferably more than 500 mm and less than 1000 mm, upstream of the fan leading edge. The nozzle 35 is positioned in radial direction at a point less than the fan diameter and greater than the fan hub diameter. Nozzle 35 is directed towards fan 25. Nozzle 35 atomizes a washing liquid forming a spray 36. Nozzle 35 provides an elliptic or rectangular spray pattern. The nozzle is oriented so that the width-wise axis of the spray pattern is parallel with leading edge 41 of blade 40. At one side of the spray pattern the width-wise distribution is limited by streamline 75. On the opposite side of the spray pattern the width-wise distribution is limited by streamline 76. From the nozzle's orifice point the width-wise measure of spray 36 at leading edge 41 will be equal to the length of leading edge 41. The spray will thereby provide liquid to the blade on its entire length from tip to hub.

Figure 6:
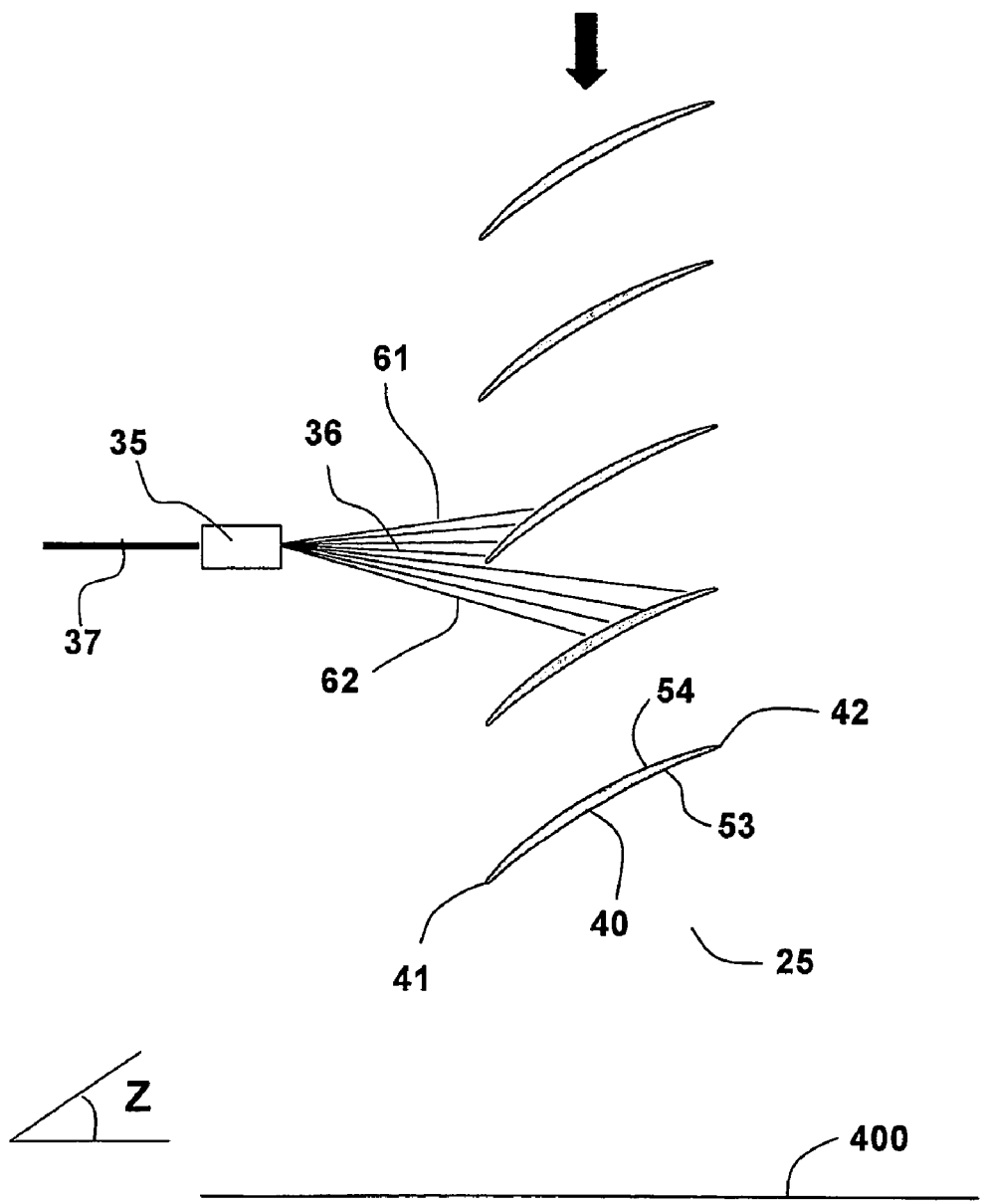
FIG. 6. shows the nozzle installation for cleaning of the fan blade suction side.

FIG. 6 shows nozzle 35 as seen from a projection from the rotor periphery towards the shaft centre. In FIG. 6 nozzle 35 is seen in its thickness-wise projection. Nozzle 35 serves the purpose of providing washing liquid for washing the suction side of blade 40. Fan 25 consists of numerous of fan blades mounted on the fan hub and extending basically in radial direction. The view shows the typical blade pitch relative to the engine centreline 400. The fan rotates in the direction indicated by arrow. Blade 40 has a leading edge 41 and a trailing edge 42. Blade 40 has a pressure side 53 and a suction side 54. Nozzle 35 is installed at a point upstream of fan 25. FIG. 6 shows the nozzle tangential angle Z relative to the engine centre line 400. The tangential angel is preferably more than 20 degrees and less than −20 degrees, and more preferably zero degrees, relatively the engine centre line 400. Nozzle 35 atomizes a washing liquid forming a spray 36. Nozzle 35 is directed towards fan 25. Nozzle 35 forms an elliptic or rectangular spray pattern. Nozzle 35 is oriented around the nozzle axis so that the thickness-wise axis of the spray pattern is limited on one side of the spray pattern by streamline 61 and on the opposite side of the spray pattern by streamline 62.

Returning to FIG. 4, this figure shows the third nozzle type; nozzle 33, and it's with-wise projection. Nozzle 33, has the objectives of providing washing liquid for washing of the core engine. Nozzle 33 is positioned in axial direction at a point preferably more than 100 mm, and more preferably more than 500 mm and less than 1000 mm, upstream of the fan leading edge. Nozzle 33 is positioned in radial direction at a point less than half the fan diameter and greater than the fan hub diameter. Nozzle 33 is oriented as to allow the liquid to penetrate through the fan in between the blades. Nozzle 33 atomizes a washing liquid forming a spray 34. Nozzle 33 forms an elliptic or rectangular spray pattern. The nozzle is oriented so that the width-wise axis of the spray pattern is parallel with leading edge 41 of blade 40. At one side of the spray pattern the width-wise distribution is limited by streamline 47. On the opposite side of the spray pattern the width-wise distribution is limited by streamline 48. The air inlet to the core engine has an opening corresponding to the distance between splitter 45 and point 46. The width-wise measure of spray 34 at the inlet opening to the core engine will correspond to the distance between splitter 45 and point 46. Spray 34 thereby provides liquid for entering inlet 23.

Figure 7:
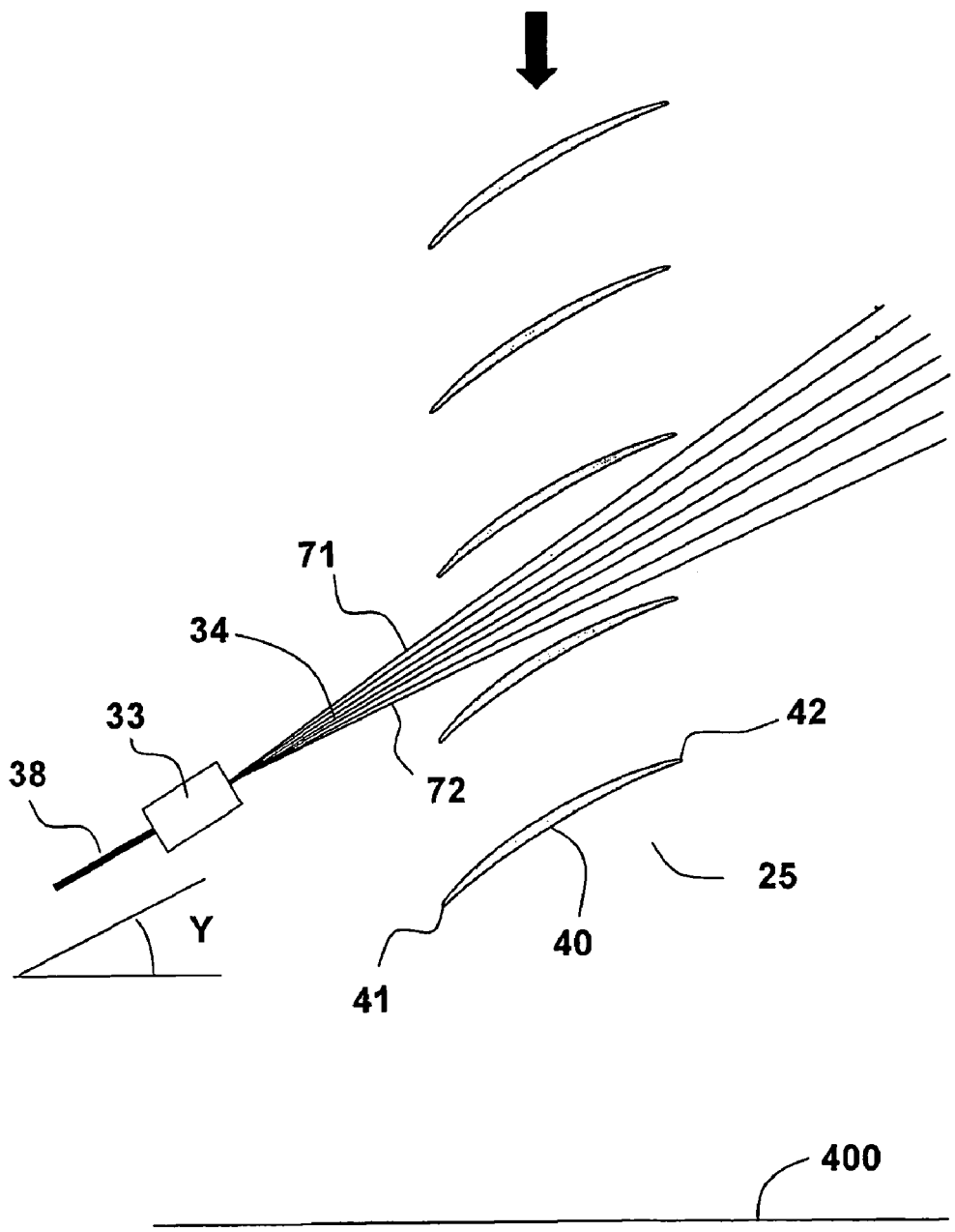
FIG. 7. shows the nozzle installation for cleaning of the core engine.

FIG. 7 shows details of a typical installation of nozzle 33 as seen from a projection from the rotor periphery towards the shaft centre. In FIG. 7 nozzle 33 is seen in its thickness-wise projection. Fan 25 consists of numerous of fan blades mounted on the fan hub and extending basically in radial direction. The view shows a typical blade pitch relative to the engine centreline 400. The fan rotates in the direction indicated by arrow. Blade 40 has a leading edge 41 and a trailing edge 42. The third nozzle type, nozzle 33, has the purpose of providing washing liquid for washing the core engine. Nozzle 33 is positioned at a point upstream of fan 25. FIG. 7 shows the nozzle tangential angle Y relative the engine centre line 400. The tangential angle Y is preferably more than 20 degrees, and more preferably more than 25 degrees and less than 30 degrees relative to the engine centre line 400. Nozzle 33 atomizes a washing liquid forming a spray 34. The spray from nozzle 33 is directed as to allow the liquid to penetrate through the fan, in between the blades, in direction from leading edge 41 towards trailing edge 42. Nozzle 33 forms an elliptic or rectangular spray pattern. Nozzle 33 is oriented around the nozzles axis so that the thickness-wise axis of the spray pattern is limited on one side of the spray pattern by streamline 71 and on the opposite side of the spray pattern by streamline 72. Nozzle 33 is oriented relative to the shaft centreline 400 as to enable liquid to pass in between the fan blades. Liquid penetrating through the fan will enter into core engine at inlet 23.

Although specific embodiments have been shown and described herein for purposes of illustration and exemplification, it is understood by those of ordinary skill in the art that the specific embodiments shown and described may be substituted for a wide variety of alternative and/or equivalent implementations without departing from the scope of the present invention. This application is intended to cover any adaptations or variations of the preferred embodiments discussed herein. Consequently, the present invention is defined by the wordings of the appended claims and equivalents thereof.

The invention claimed is:

1. A device for cleaning a gas turbine engine, which engine includes at least one engine shaft, a fan rotatably arranged on a first shaft, which fan comprises a plurality of fan blades mounted on a hub and extending substantially in a radial direction each having a pressure side and a suction side, and a core engine including a compressor unit and turbines for driving said compressor unit and said fan, the device comprising one or more nozzles arranged to atomize cleaning liquid in the air stream in an air inlet of the engine, wherein the one or more nozzles comprises at least one of:

a first nozzle arranged at a position relative a centre line of said engine arranged such that the cleaning liquid emanated from said first nozzle is regulated in a direction so that a substantial portion of the cleaning liquid emanated impinges the surfaces of said blades on said pressure side and a limited portion impinges said surfaces of said blades on said suction side or passes between the blades;

a second nozzle arranged at a position relative said centre line of said engine arranged such that the cleaning liquid emanated from said second nozzle is regulated in a direction so that a substantial portion of the cleaning liquid emanated impinges the surfaces of said blades on said suction side and a limited portion impinges said surfaces of said blades on said pressure side or passes between the blades; or a third nozzle arranged at a position relative said centre line of said engine arranged such that the cleaning liquid emanated from said third nozzle is regulated in a direction so that a substantial portion of the cleaning liquid emanated passes between said blades and enters an inlet of said core engine and a limited portion impinges said surfaces of said blades;

wherein said one or more nozzles comprises each of said first nozzle, second nozzle and third nozzle; and said inlet of said core engine is limited by on one side a splitter and on the other side a point on said hub, wherein said third nozzle is arranged so that the cleaning liquid emanated from said third nozzle forms a spray which, at said inlet, has a width, along an axis substantially parallel with the radial extension of the blades of said fan, substantially equal to the distance between said splitter and said point on said hub.

2. A device according to claim 1, wherein said first nozzle and said second nozzle are arranged so that the cleaning liquid emanated from said first nozzle and said second nozzle, respectively, form a spray which, at impinge against a blade, has a width, along an axis substantially parallel with the radial extension of the blades of said fan, substantially equal to the length of a leading edge of said blade.

3. A device according to claim 1, wherein said first nozzle is arranged at a first tangential angle (X) relatively to said centre line of said engine, and/or said second nozzle is arranged at a second tangential angle (Z) relatively to said centre line of said engine, and/or said third nozzle is arranged at a third tangential angle (Y) relatively to said centre line of said engine.

4. A device according to claim 3, wherein said first tangential angle (X) is greater than 40 degrees.

5. A device according to claim 3, wherein said second tangential angle (Z) is greater than −20 degrees and less than 20 degrees.

6. A device according to claim 3, wherein said third tangential angle (Y) is greater than 20 degrees.

7. A device according to claim 1, wherein each of said first nozzle, said second nozzle, and said third nozzle are arranged at a point more than 100 mm in an axial direction upstream the leading edge of said fan.

8. A device according to claim 1, wherein each of said first nozzle, said second nozzle, and said third nozzle are arranged at a position, in a radial direction, at a point less than the diameter of the fan and greater than a diameter of said hub of said fan.

9. A method for cleaning a gas turbine engine, which engine includes at least one engine shaft, a fan rotatably arranged on a first shaft, which fan comprises a plurality of fan blades mounted on a hub and extending substantially in a radial direction each having a pressure side and a suction side, and a core engine including a compressor unit and turbines for driving said compressor unit and said fan, said method comprising one or more nozzles arranged to atomize cleaning liquid in the air stream in an air inlet of the engine, wherein the method comprises the steps of:

applying cleaning liquid emanated from at least one of:

a first nozzle arranged such that the cleaning liquid emanated from said first nozzle is controlled such that a substantial portion of the cleaning liquid emanated impinges the surfaces of said blades on said pressure side and a limited portion impinges said surfaces of said blades on said suction side or passes between the blades;

a second nozzle arranged such that the cleaning liquid emanated from said second nozzle is controlled such that a substantial portion of the cleaning liquid emanated impinges the surfaces of said blades on said suction side and a limited portion impinges said surfaces of said blades on said pressure side or passes between the blades; or a third nozzle arranged such that the cleaning liquid emanated from said third nozzle is controlled such that a substantial portion of the cleaning liquid emanated impinges the surfaces of said blades between said blades and enters an inlet of said core engine and a limited portion impinges said surfaces of said blades;

wherein the step of applying cleaning liquid comprises applying cleaning liquid from each of said first nozzle, second nozzle and third nozzle; and said inlet of said core engine is limited by on one side a splitter and on the opposite side, a point on said hub, comprising the step of: forming a spray of the cleaning liquid emanating from said third nozzle which, at said inlet, has a width, along an axis substantially parallel with the radial extension of the blades of said fan, substantially equal to the distance between said splitter and said point on said hub.

10. A method according to claim 9, comprising the step of: forming a spray of the cleaning liquid emanated from said first nozzle and said second nozzle, respectively, which, at impinge against said leading edge, has a width, along an axis substantially parallel with the radial extension of the blades of said fan, substantially equal to the length of a leading edge of a blade.

11. A method according to claim 9, comprising the steps of: directing the cleaning liquid emanated from said first nozzle at a first tangential angle (X) relatively to said centre line of said engine, and/or directing the cleaning liquid emanated from said second nozzle at a second tangential angle (Z) relatively to said centre line of said engine, and/or directing the cleaning liquid emanated from said third nozzle at a third tangential angle (Y) relatively to said centre line of said engine.

12. A method according to claim 11, wherein said first tangential angle (X) is greater than 40 degrees.

13. A method according to claim 11, wherein said second tangential angle (Z) is greater than −20 degrees and less than 20 degrees.

14. A method according to claim 11, wherein said third tangential angle (Y) is greater than 20 degrees.

15. A device according to claim 3, wherein said first tangential angle (X) is greater than 60 degrees and less than 80 degrees.

16. A device according to claim 3, wherein said second tangential angle (Z) is substantially zero degrees.

17. A device according to claim 3, wherein said third tangential angle (Y) is greater than 25 degrees and less than 30 degrees.

18. A method according to claim 9, further comprising the step of arranging each of said first nozzle, said second nozzle, and said third nozzle at a point more than 100 mm in an axial direction upstream the leading edge of said fan.

19. A method according to claim 9, comprising the step of arranging each of said first nozzle, said second nozzle, and said third nozzle at a position, in a radial direction, at a point less than the diameter of the fan and greater than a diameter of said hub of said fan.

20. A device according to claim 1, wherein each of said first nozzle, said second nozzle, and said third nozzle are arranged at a point more than 500 mm and less than 1000 mm upstream the leading edge of said fan.

21. A device for cleaning a gas turbine engine, said engine including at least one engine shaft, a fan rotatably arranged on a first shaft, said fan comprising a plurality of fan blades mounted on a hub and extending substantially in a radial direction wherein each of said blades include a pressure side and a suction side, and a core engine including a compressor unit and turbines for driving said compressor unit and said fan, said device comprising:

one or more nozzles arranged to atomize cleaning liquid in said air stream in an air inlet of said engine, wherein said one or more nozzles comprises at least one of:

a first nozzle arranged at a position transverse a centre line of said engine such that said cleaning liquid emanated from said first nozzle is sprayed at a first angle relative to the center line and in a direction so that a substantial portion of the cleaning liquid emanated impinges said surfaces of said blades on said pressure side and a limited portion impinges said surfaces of said blades on said suction side or passes between the blades;

a second nozzle arranged at a position transverse said centre line of said engine such that said cleaning liquid emanated from said second nozzle is sprayed at a second angle relative to the center line that is different than the first angle, and in a direction so that a substantial portion of the cleaning liquid emanated impinges said surfaces of said blades on said suction side and a limited portion impinges said surfaces of said blades on said pressure side or passes between the blades; or a third nozzle arranged at a position transverse said centre line of said engine such that said cleaning liquid emanated from said third nozzle is sprayed at a third angle relative to the center line that is different than both the first angle and the second angle, and in a direction so that a substantial portion of the cleaning liquid emanated passes substantially between said blades and enters an inlet of said core engine and a limited portion impinges said surfaces of said blades;

wherein said one or more nozzles comprises each of said first nozzle, second nozzle and third nozzle; and said inlet of said core engine is limited by on one side a splitter and on the other side a point on said hub, wherein said third nozzle is arranged so that the cleaning liquid emanated from said third nozzle forms a spray which, at said inlet, has a width, along an axis substantially parallel with the radial extension of the blades of said fan, substantially equal to the distance between said splitter and said point on said hub.

22. A device according to claim 21 further comprising: two or more nozzles arranged to atomize cleaning liquid in said air stream in an air inlet of said engine, wherein said two or more nozzles comprises at least two of said first nozzle, said second nozzle or said third nozzle.

* * * * *